Aug. 30, 1932. E. J. FRANKLIN 1,874,488
BURNER FOR PULVERIZED FUEL
Filed Aug. 15, 1928 4 Sheets-Sheet 1
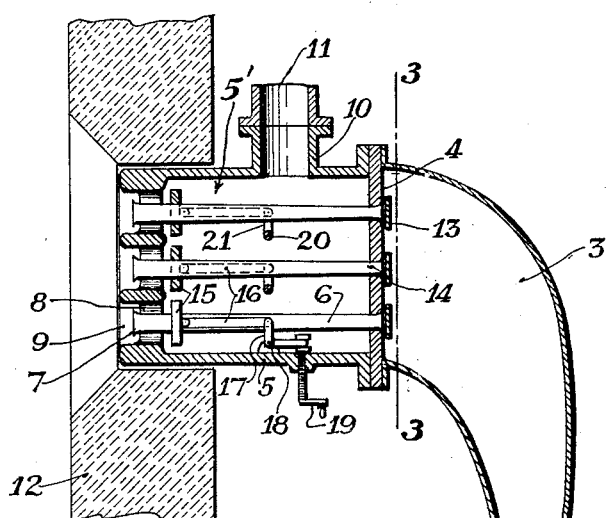
Fig.1
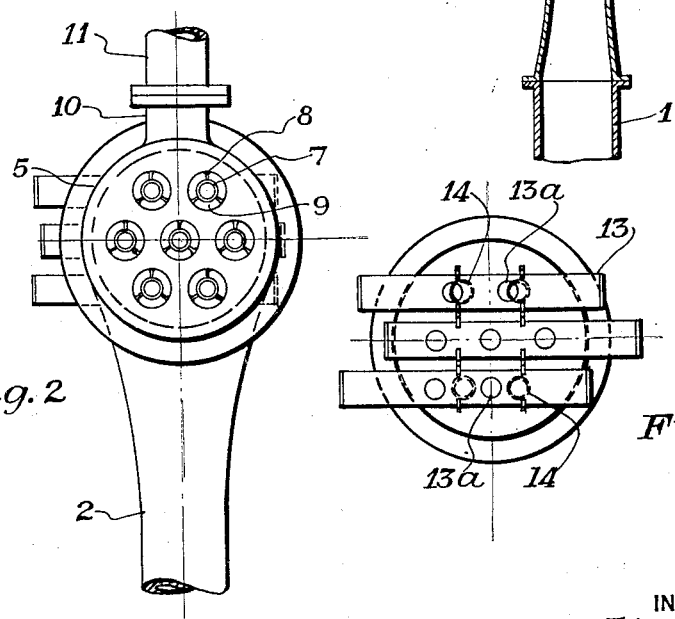
Fig.2
Fig.3
INVENTOR
Edward J. Franklin
BY
ATTORNEYS.

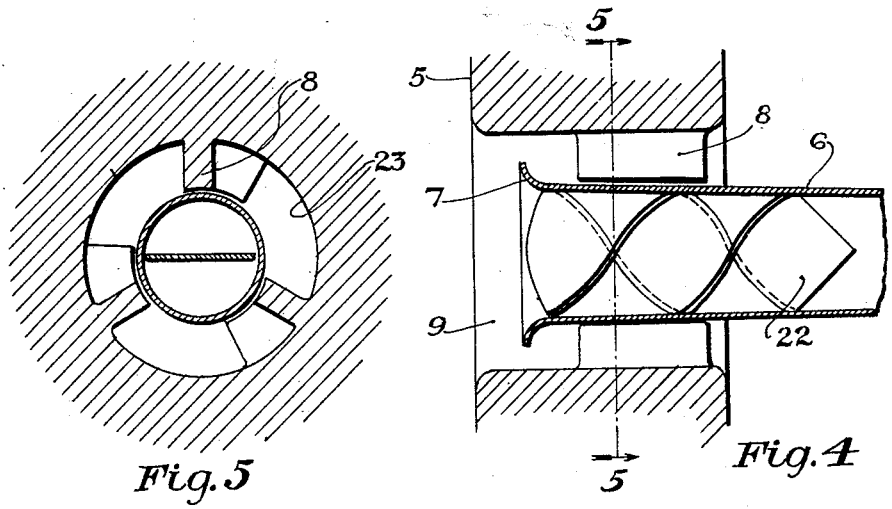
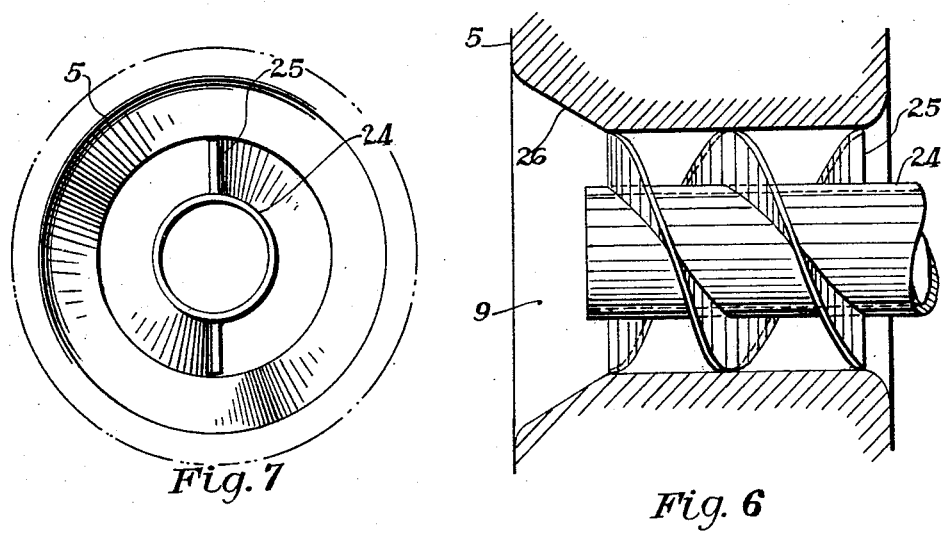

Aug. 30, 1932.   E. J. FRANKLIN   1,874,488
BURNER FOR PULVERIZED FUEL
Filed Aug. 15, 1928   4 Sheets-Sheet 3

INVENTOR
Edward J. Franklin
BY
ATTORNEY

Aug. 30, 1932.  E. J. FRANKLIN  1,874,488
BURNER FOR PULVERIZED FUEL
Filed Aug. 15, 1928   4 Sheets-Sheet 4

INVENTOR
Edward J. Franklin
BY
ATTORNEYS.

Patented Aug. 30, 1932

1,874,488

UNITED STATES PATENT OFFICE

EDWARD J. FRANKLIN, OF SALT LAKE CITY, UTAH

BURNER FOR PULVERIZED FUEL

Application filed August 15, 1928. Serial No. 299,842.

This invention relates to means for burning pulverized fuels, for example solid fuels such as coal or coke in the state of fine division, and the objects of the invention are:—

To provide a means whereby an intimate and proper mixture of air and fuel, more particularly pulverized or powdered fuel, is obtained previous to the admission of the mixture into a furnace or other space properly prepared for the combustion of such mixture, such as a furnace in conjunction with a steam boiler, a reverberatory furnace, such as is used in metallurgical operations, a heating furnace, a lime or cement kiln, etc.

To provide in a burner entrance pipe, an expansion chamber, wherein is produced a marked reduction in the velocity of the air and fuel stream entering therein from a supply pipe, said reduction in velocity, combined with the peculiar shape of such expansion chamber operating to produce a turbulent condition of the air and fuel particles within said chamber, resulting in a more intimate mixture of said air and fuel particles, elimination of stratification, etc.

To provide in a pulverized fuel burner, a multiplicity of relatively small tubes or jets, through which the mixture of air and fuel is controlled and projected at a relatively low velocity into the combustion chamber. The particular virtue of obtaining relatively low entrance velocity into the combustion space is to reduce the length of flame travel within the furnace, thereby promoting the use of a smaller furnace volume for a given fuel burning capacity, and producing the combustion close to the burner tip. It is understood that the term "relatively low velocity" must be considered as meaning a velocity lower than that ordinarily existing in furnaces but greater than the rate of flame propagation of the particular fuel being used, in order to prevent a "flare back" into the burner body and expansion chamber.

To provide a burner with means of regulating or controlling the amount of fuel and air injected into the combustion space to care for high or low ratings without materially changing the proportions of the fuel mixture or the velocity of injection into the combustion space, thereby maintaining efficient combustion at any and all ratings. This is accomplished by cutting the fuel and air from or admitting the fuel and air to a greater or less number of the multiplicity of relatively small tubes or jets by means of dampers, valves, or gates.

To provide, in a burner arrangement, a means for introducing and controlling both the primary and the secondary air required for the combustion of pulverized fuels directly at the burner tip. Said secondary air preferably to be supplied under pressure, although natural draft may be utilized depending upon conditions prevailing at any given installation.

To provide, in a pipe preferably in a vertical position supplying pulverized fuel to a burner arrangement, a reduced section of conveying conduit or Venturi-shaped portion, so disposed as to increase the velocity of the enclosed air and fuel stream previous to its entrance into an expansion chamber. A suitably disposed air connection adjacent to said reduced section or Venturi-shaped portion is provided to admit any required amount of secondary air, for the purpose of accelerating the fuel stream within the pipe, thereby creating a more complete mixture of air and fuel particles within the aforementioned expansion chamber previous to injecting the fuel mixture into a combustion chamber.

To provide a burner, particularly adapted for use with reverberatory furnaces, rotary kilns, or other furnaces, such that the propagation of flame will take place relatively close to the firing end or head of such furnace or kiln, allowing free sweep of the hot gases for the greater portion of the length of said furnace or kiln.

In contrast to the above, when using other type of burners with the above noted furnaces or kilns the fuel and air mixture is projected at a relatively high velocity into the combustion space, resulting in a long flame travel and the consequent propagation of flame at a considerable distance away from the firing end of the furnace or kiln.

Referring to the figures of the drawings:

Fig. 1 is a sectional elevation through the burner and supply pipe.

Fig. 2 is a front elevation of the burner shown in Fig. 1.

Fig. 3 is a section on line 3—3 in Fig. 1, showing the arrangement and operation of the fuel inlet control device.

Fig. 4 is an enlarged sectional detail of one of the fuel burner tips.

Fig. 5 is a sectional elevation along the plane 5—5 in Fig. 4.

Fig. 6 is a detail showing the application of a series of helical vanes applied to the exterior of a fuel burner tip.

Fig. 7 is a front elevation of the construction shown in Fig. 6.

Figures 8, 9:
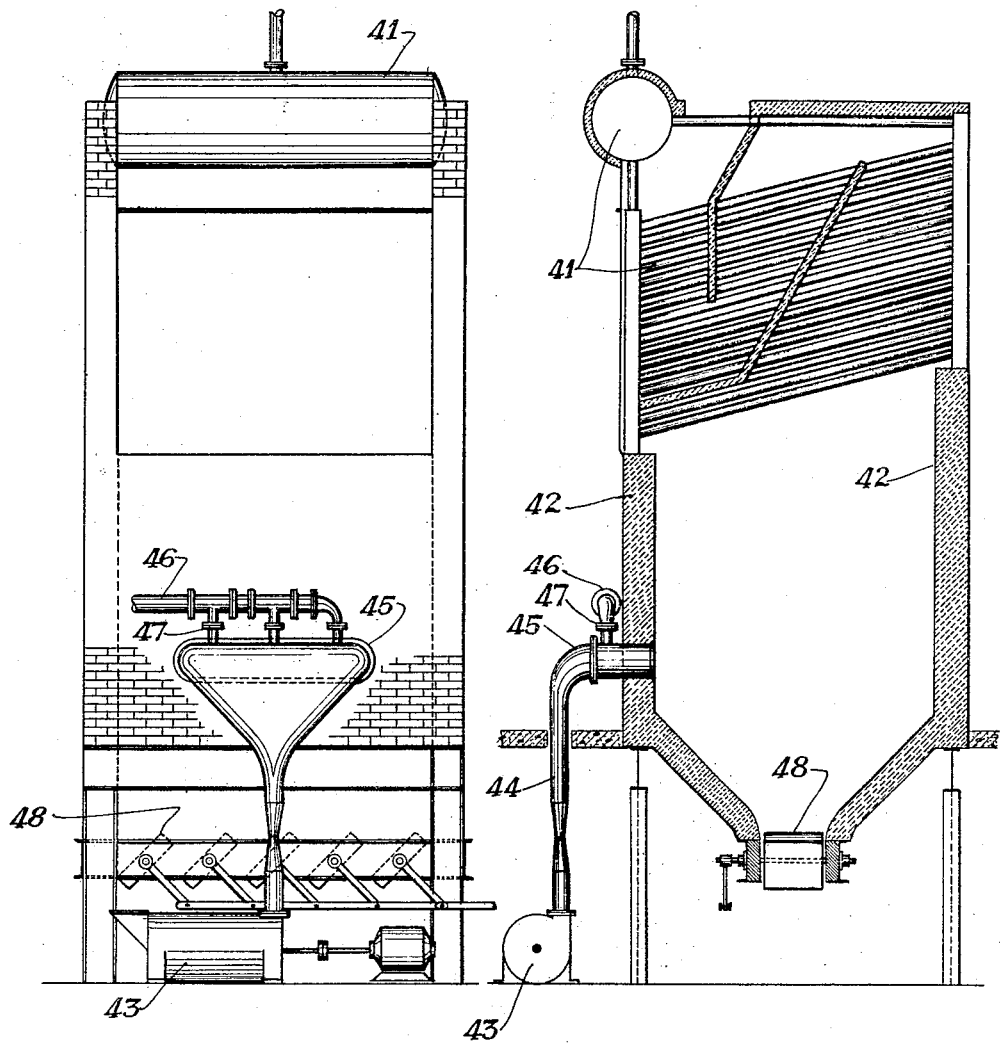
Fig. 8 is a sectional elevation showing the application of the hereinafter described fuel burner arrangement to a steam boiler furnace.
Fig. 9 is a front elevation of the furnace and boiler application shown in Fig. 8.

Referring now to the figures, wherein the same numerical reference designates the same part in each of the several figures:

The numeral 1 indicates a fuel supply pipe connecting to any convenient source of fuel supply, as for instance in the case of using pulverized coal, coke, or similar fuel, a unit type pulverizer, 2 is a Venturi or nozzle shaped portion of the fuel supply pipe, so arranged as to produce an increase in the velocity of the fuel streams and carrier or primary air through said pipe portion, and enlarging at its upper portion into the expansion or mixing chamber 3, wherein, due to the enlarged space, and the peculiar hooded shape the acceleration given the fuel and air streams is dissipated, resulting in a turbulent condition of the air and fuel, which in turn produces an intimate mixture of air and fuel within the expansion chamber 3. The expansion chamber 3 extends upwardly from the Venturi inlet and flares and curves forwardly to form a hub or cowl whose forward or upper end is substantially vertical and the burner means is attached to this upper forward end of the expansion chamber by means of a tube-plate 4 secured to the member 3 and forming a support for the burner body.

The tube plate 4 has attached to it any desired number of relatively small tubes or jets 6, the number of which tubes being proportional to the desired velocity of fuel injection through said tubes into a furnace or other combustion chamber. The ends 14, of the tubes 6, are fixed to the tube plate 4, in any desired manner, as for instance by screwing, rolling, or expanding in a manner similar to that used in attaching boiler tubes to tube sheets. A burner body 5 is secured to the tube plate 4 in any suitable manner and is formed with an inlet chamber 5' for secondary air. The burner or fuel tubes 6 extend through said chamber 5' and into burner openings in the front wall of said chamber.

Each tube 6 may be so fabricated as to be slightly conical or diverging in shape with its larger end terminating in a bell mouth section 7, to further insure the ready passage of the fuel particles in a diverging cloud rather than a simple cylindrical stream.

Surrounding the tube end 7, is an annular air passage or opening 9 formed in the front wall of the burner body 5 and provided with either axially or helically disposed vanes 8, which may serve the dual purpose of imparting rotation to a supply of secondary air, and of supporting the tube end 7 in its operating position.

The vanes 8 may be so constructed as to be an integral portion of the burner body 5, as shown more particularly in Figs. 4 and 5, or they may be independent members 25, attached to the tubes 24, as shown in Figs. 6 and 7.

In Fig. 4 is shown an internal helical vane member 22 within the tube 6, the object of which is to produce a whirling motion to the fuel streams passing through the tube, said whirling motion being in the opposite direction of rotation from that produced in the secondary air stream by the vanes 8 or 25. It should be understood that the application of these external and internal vanes as shown in Figs. 4 and 6 are not mutually exclusive, as I reserve the privilege of applying these vanes in any combination with respect to each other.

Fig. 6 shows the application of a straight cylindrical tube 24, located in all respects in a position similar to that designated as tube 6 in other figures, it being understood that a straight, converging, diverging or any other form of tube and tube end may be substituted for the particular form indicated in any figure. Neither are the vanes 8, 22 and 25 limited to the exact forms indicated in the figures, inasmuch as the helical angles of these vanes may be adjusted as conditions may warrant in any particular case.

Returning to Fig. 1, the burner body 5 may be of any suitable material or convenient shape, as, for instance, it may be cylindrical, as shown in Fig. 2; elongated as in Fig. 4; oval, elliptical or rectangular (not shown), as determined by the number and disposition of the fuel tubes 6, and the physical limitations as to space in any given instance.

Opening into the burner body 5 is a connection 10, to which may be attached a pipe 11, connecting to any convenient source of hot or cold air supply. Air entering through the opening 10 is designated as "secondary air for combustion" and is necessary to make up the usual deficiency in the combustion requirements of the air content of the fuel and air stream furnished from a pulverizer or other source of fuel supply. This secondary air, furnished preferably under pressure by fans or otherwise, passes out through the ports 9, adjacent to ends 7 of the fuel tubes 6, thereupon mixing with the air and fuel streams being projected into the furnace from the fuel tubes 6, and producing the proper proportion of air and fuel to effect the most efficient combustion of the fuel.

As before mentioned, due to the relatively low entrance velocity of fuel into the combustion space, complete combustion will take place relatively close to the burner face, reducing the space in the furnace ordinarily required for a great length of flame travel, and also eliminating, in certain types of furnaces, the abrasion of the furnace walls opposite the burner location caused by the projection of fuel particles at high velocity across the combustion chamber.

The means for controlling the admission of fuel into the several fuel jets or tubes 6 are shown in Figs. 1 and 3, wherein 13 is a chain means consisting of a damper or valve plate slidably mounted in any convenient manner on the tube plate 4, adjacent to the entrance ends 14 of the tubes 6. Plate 13 is provided with a series of ports 13a, so disposed as to register with the tube ends 14. In Fig. 3 the upper damper is shown in the half open position, the center damper is shown in the fully open position, while the lower damper is shown in a completely closed position. It is understood that the number and design of dampers and groups of fuel jets or tubes indicated in Fig. 3 is merely for convenience in illustrating the mechanism and that any desired number or design of dampers and fuel tubes may be installed in any given case. The burner tubes 6 are arranged in horizontal rows at definite heights, and a damper plate 13 is provided for each horizontal row, said damper plate being located within the mixing chamber 3 and provided with means extending outside of said chamber, as shown in Figs. 2 and 3, for operation of said damper plates from the outside.

The control of secondary air is obtained by means of the mechanism shown in Fig. 1, wherein 15 is a valve plate provided with openings fitting on the respective tubes 6 so that said valve plate is slidably mounted upon the fuel tubes 6, and connected by means of the links 16 and levers 17, pivoted at point 18, to the adjusting screw 19, there being, in the form of the invention here shown, a valve plate 15 for each horizontal row of tubes, and the said valve plates constituting closure means located within the secondary air inlet chamber 5' and having operating means extending outside of said chamber for convenient operation thereof. For adjusting the valve plates 15 of the upper rows or groups of tubes the mechanism may be similar to that just above described or the adjusting means may be composed of a shaft 20, extending transversely across the burner body 5, and rotatively mounted therein, carrying at either or both of its extending ends a hand wheel, lever or other means (not shown) for rotating the shaft 20. Levers, or arms 21, are fixed to shaft 20 and are connected to the valve plates 15 by means of suitable links 16. In operation, the valve plates 15 are adjusted with relation to the inboard end of the air port 9, so that the secondary air passing through the air port 9 bears any predetermined relation to the amount of fuel passing through the fuel tube or jet 6, as fixed by the desired adjustment of the fuel dampers 13.

Figs. 8 and 9 show in general the application of the hereinbefore described fuel burner arrangement to a steam boiler furnace, wherein 41 indicates any type of steam boiler being shown for convenience as a cross drum horizontal water tube type; 42 indicates the walls of a furnace of any desired type of construction; 43 is a fuel pulverizer, adapted for the pulverization and supply of coal, coke, lignite, etc.; 44 is the pipe connecting this pulverizer with the burner 45 of any desired size or shape, substantially as above described. The pipe 46, terminating in connections 47, carries the secondary air to the burner 45, from any convenient source of supply. At the lower portion of the furnace is an ash gate-damper arrangement 48, which is very similar to the one described in my application Serial No. 299,841 of even date. When these gate-dampers are used in connection with the herein described burner apparatus, the openings through the gate-damper 48 should be only enough to allow the entrance of sufficient air for cooling the falling ash to a temperature below the slagging point and to admit enough secondary air to compensate for any deficiency in secondary air supplied through the burner.

Figure 10:
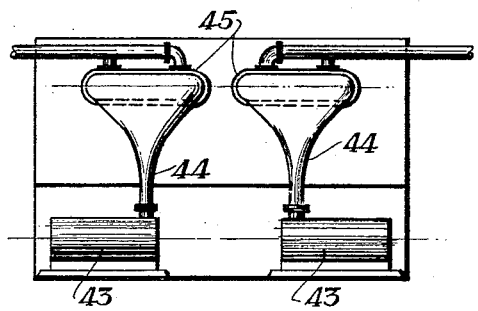
Figs. 10 and 11 are front and sectional elevations respectively, showing the application of the burner arrangement to a reverberatory or heating furnace.
Figure 11:
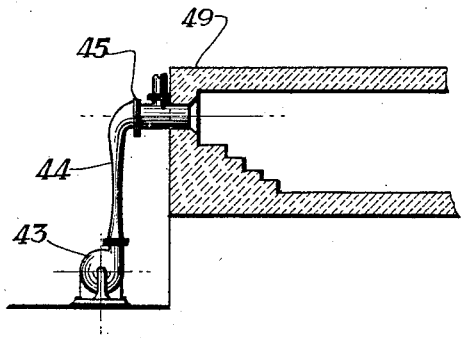

In Figs. 10 and 11 is shown the application of the burner system to a reverberatory or heating furnace wherein the fuel requirements might be too great for a single pulverizer unit. In this case, a series of independent pulverizers 43, pipes 44 and burners 45 are applied at the firing end of the furnace 49, the pulverizers being located in a position below the furnace to allow for the vertical rise of the fuel pipe 44 to the burner 45.

Figure 12:
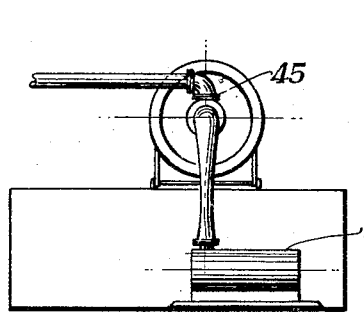
Figs. 12 and 13 are front and side elevations, respectively, showing the application of the burner arrangement to a rotary kiln such as is used for burning lime, cement, etc.
Figure 13:
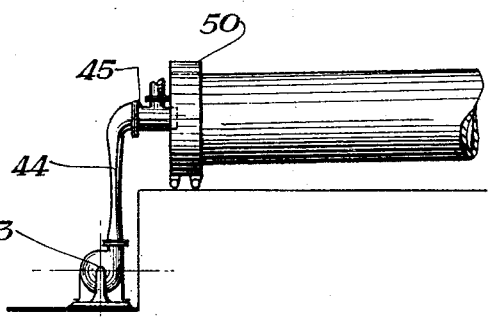

In Figs. 12 and 13 is shown the application of the burner system to a rotary kiln, wherein the pulverizer 43, fuel pipe 44 and burner 45 are located adjacent to and below the firing end of the kiln 50.

An important feature of the invention, as exemplified in each of the forms shown in the drawings, is that the mixing and expansion chamber for the powdered fuel and air extends vertically and has its inlet at its lower end, the chamber expanding upwardly from said inlet. As the result of this construction any powdered fuel which is not effectively suspended and carried forward in the current, or in the turbulent body of air, will fall back toward the inlet and be again subjected to the mixing action so that there is no possibility of the powdered fuel collecting in any part of the mixing chamber or clogging the passages.

A further important feature of the invention is that the air and powdered fuel enter the mixing chamber at relatively high velocity; are then slowed down by expansion of area in the mixing chamber, are again given a high velocity on entering the burner tubes and issue from the burner tubes and into the combustion chamber at a relatively low velocity so as to provide for most effective mixture while at the same time providing for efficient combustion with a relatively short flame as above described.

I claim:

1. A burner for pulverized fuel comprising a mixing and expansion chamber provided with a Venturi inlet, means for supplying primary air and pulverized fuel at high velocity through said Venturi inlet into said mixing and expansion chamber in such manner as to produce a condition of turbulence, a plurality of burner tubes communicating with said mixing and expansion chamber and adapted to receive a mixture of fuel and air therefrom, a secondary air inlet chamber surrounding said burner tubes and provided with secondary air outlet openings surrounding the outlet openings of said burner tubes, for supplying secondary air directly adjacent the outlet openings of the burner tubes, closure means removably mounted within said secondary air inlet chamber for controlling said secondary air outlet openings, means connected to said closure means and extending outside of the secondary air inlet chamber for operating said closure means and means for supplying said secondary air to said secondary air inlet chamber.

2. A burner comprising a mixing chamber provided with means for supplying primary air and fuel thereto, a plurality of burner tubes communicating with said mixing chamber, a secondary air supply chamber surrounding said plurality of burner tubes and having outlet passages surrounding the outer ends of the respective burner tubes, means for supplying secondary air to said secondary air supply chamber, closure means for the respective burner tubes adapted to control communication of said burner tubes with the mixing chamber, said closure means being located within said mixing chamber and being provided with means extending outside of said mixing chamber for operation of said closure means from the outside, closure means for the outlet passages of the secondary air chamber, said last named closure means being located within said secondary air chamber, and operating means for said last named closure means extending outside of said secondary air chamber for operation thereof from the outside.

3. A burner comprising a mixing chamber provided with means for supplying primary air and fuel thereto, a plurality of burner tubes communicating with said mixing chamber, said burner tubes being arranged in a plurality of rows at different levels, a secondary air supply chamber surrounding said plurality of burner tubes and having outlet passages surrounding the outlet ends of the respective burner tubes, means for supplying secondary air to said secondary air chamber, and independently operable closure means for the respective rows of burner tubes adapted to regulate communication of certain of said burner tubes with the mixing chamber independently of other burner tubes.

4. A burner comprising a mixing chamber provided with means for supplying primary air and fuel thereto, a plurality of burner tubes communicating with said mixing chamber, a secondary air supply chamber surrounding said plurality of burner tubes and having outlet passages surrounding the outlet ends of the respective burner tubes, means for supplying secondary air to said secondary air chamber and closure means surrounding said burner tubes and slidably mounted thereon and cooperating with the outlet passages of the secondary air chamber for controlling the supply of secondary air at said passages directly adjacent the outlet ends of the respective burner tubes.

5. A burner comprising a mixing chamber provided with means for supplying primary air and fuel thereto, a plurality of burner tubes communicating with said mixing chamber, a secondary air supply chamber surrounding said plurality of burner tubes and having outlet passages surrounding the outlet ends of the respective burner tubes, means for supplying secondary air to said secondary air chamber, and closure means cooperating with the outlet passages of the secondary air chamber for controlling the supply of secondary air at the outlets of certain of the burner tubes independently of the supply of secondary air to other burner tubes, said closure means extending within said secondary air supply chamber adjacent said outlet passages and provided with operating means extending outside of said chamber for operation thereof from the outside.

6. A burner for pulverized fuel comprising a mixing and expansion chamber provided with a Venturi inlet, said chamber extending from said Venturi inlet in the form of an expanding curved hood, a burner body connected to the curved end of said expansion chamber and comprising a plurality of burner tubes communicating with the expansion chamber and an auxiliary air chamber surrounding said burner tubes and provided with air outlet passages surrounding the outlets of said burner tubes and means for supplying auxiliary air under pressure to said auxiliary air chamber.

In testimony whereof I have hereunto subscribed my name this 8th day of August 1928.

EDWARD J. FRANKLIN.